United States Patent [19]

Spease et al.

[11] Patent Number: 4,773,279
[45] Date of Patent: Sep. 27, 1988

[54] SUPPORT FITTING FOR REMOTE CONTROL ASSEMBLY

[75] Inventors: Arthur L. Spease, Livonia; Holly Walston, Utica, both of Mich.

[73] Assignee: Teleflex Incorporated, Limerick, Pa.

[21] Appl. No.: 407,498

[22] Filed: Aug. 12, 1982

[51] Int. Cl.⁴ ............................................. F16C 1/10
[52] U.S. Cl. .................................... 74/502.4; 248/56; 403/197
[58] Field of Search ................. 411/15, 548, 508, 509, 411/510, 548; 74/501 P; 248/56

[56] References Cited

U.S. PATENT DOCUMENTS

| | | | |
|---|---|---|---|
| 2,891,103 | 6/1959 | Swengel | 74/501 P |
| 3,162,411 | 12/1964 | Duggan | 248/56 |
| 3,398,600 | 8/1968 | White et al. | 74/501 P |
| 3,427,894 | 2/1969 | Tschanz | 74/501 |
| 3,645,150 | 2/1972 | Crossland | 74/501 P |
| 3,875,843 | 4/1975 | Maeda et al. | 411/508 X |
| 4,011,770 | 3/1977 | Webb | 74/501 |
| 4,304,148 | 12/1981 | Hamman | 74/501 P X |
| 4,333,361 | 6/1982 | Spease | 74/501 P X |
| 4,380,178 | 4/1983 | Bennett et al. | 74/501 P X |

*Primary Examiner*—Gary L. Smith
*Assistant Examiner*—Rodney M. Lindsey
*Attorney, Agent, or Firm*—Reising, Ethington, Barnard, Perry & Milton

[57] ABSTRACT

A motion-transmitting remote control assembly having a support means (22) for moving through and engaging opposite extremites of an aperture (24). The support means (22) includes a body portion (40) and a pair of legs (26) extending from the body portion (40). The legs (26) include grooves (38) to engage a wall as the legs (26) extend in a cantilevered fashion towards the aperture (24). The legs (26) further include release tabs (36) for moving the legs (26) radially inwardly towards the body portion (40) to disengage the legs (26) from the wall to remove the support means (22) from the aperture (24).

2 Claims, 1 Drawing Sheet

SUPPORT FITTING FOR REMOTE CONTROL ASSEMBLY

TECHNICAL FIELD

This invention relates to a motion-transmitting remote control assembly which is normally operated to control a device by transmitting motion in a curved path by means of a flexible motion-transmitting core element.

BACKGROUND ART

Remote control assemblies of the type with which the instant invention is particularly applicable typically include a conduit, which movably supports a motion-transmitting core element, and fittings disposed on the conduit and adapted to be attached to a support structure. The motion-transmitting core element may be of any type suitable for movement within a guide means. Such remote control assemblies are frequently utilized in aircraft, marine vehicles, and automobiles, or other similar equipment. For example, such remote control assemblies are frequently utilized as push/pull control assemblies in automobiles for positioning vents or controlling heaters, and the like. In such an installation, normally one end of the remote control assembly is attached in the dashboard or instrument panel area of the automobile while the other end is disposed adjacent the particular element to be controlled, such as a vent or heater. Frequently, one or both ends of the conduit passes through an aperture in a bulkhead and a fitting is disposed in the aperture to support the conduit in the bulkhead. In many of the prior art assemblies, the fittings which attach the core element to a control member or which support the conduit frequently engage an aperture by being snapped into mechanical engagement with the aperture. An example of such a fitting is shown in U.S. Pat. No. 3,427,894 to A. E. Tschanz, which is assigned to the assignee of the subject application.

A facility that the prior art assemblies do not have is the facility to be easily removed from an aperture in which is has been snapped into engagement.

The U.S. Pat. No. 4,011,770 to Webb provides a support fitting for snapping into mechanical interlocking engagement with a wall having an aperture therein and includes leg means supported in a cantilevered fashion for moving through the aperture and snapping into engagement with the wall at the opposite extremity of the aperture for retaining support fitting in the aperture. However, this support fitting is limited to supporting motion-transmitting core elements parallel to or along a bulkhead, and is not directed to supporting motion-transmitting core elements which extend through a bulkhead.

STATEMENT OF INVENTION AND ADVANTAGES

The subject invention includes a motion-transmitting remote control assembly of the type for transmitting motion in a curved path by a flexible motion-transmitting core element. The assembly includes a guide means and a motion-transmitting core element movably supported by the guide means. A support means is attached to the guide means for moving through and retaining engagement with an aperture by engaging the near and far extremities of the aperture. The support means includes a body portion surrounding the core element and a pair of legs disposed on opposite sides of the body portion and extending outwardly in a cantilevered fashion from the body portion. The legs are flexible for moving to distal ends radially inward as the support means is inserted into the aperture. Each distal end of each leg has a wall-receiving groove defined by a shoulder spaced from an abutment so that the shoulder engages the far extremity of the aperture as the abutment engages the near extremity of the aperture for retaining the support means in the aperture. A release tab extends axially from each abutment of each of the legs for manually moving the legs radially inwardly to release the abutments from engagement with the aperture to remove the support means from the aperture.

The subject invention has the advantage of supporting a conduit in an aperture through which the conduit extends and which may be manually removed from the aperture from the side on which it was inserted into the aperture.

FIGURES IN THE DRAWINGS

Other objects and attendant advantages of the present invention will be readily appreciated as the same becomes better understood by reference to the following detailed description when considered in connection with the accompanying drawings wherein.

DETAILED DESCRIPTION OF THE DRAWINGS

Figure 1:
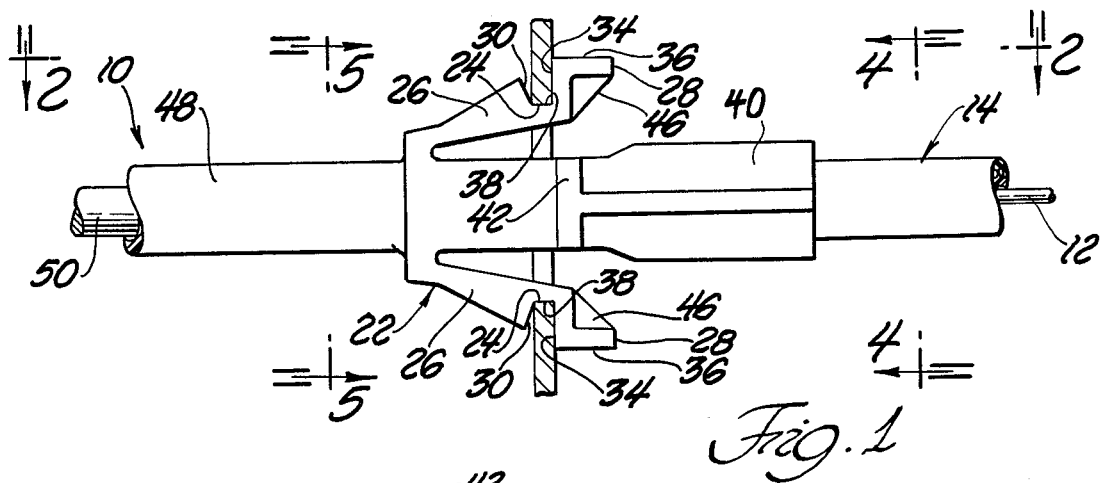
FIG. 1 is a fragmentary side-elevational view of the motion-transmitting remote control assembly of the instant invention.

Referring now to the drawings, wherein like numerals indicate like or corresponding parts throughout the several views, a remote control assembly constructed in accordance with the subject invention is generally shown at 10. The remote control assembly 10 includes a motion-transmitting core element generally indicated at 12, a guide means generally indicated at 14, and a support means generally indicated at 22.

The motion-transmitting core element 12 preferably comprises a wire including a loop at one end (not shown) for attachment for an element to be controlled. The wire-like core element 12 is connected to a metal bar or rod 50 disposed within the tubular extension 48. The bar 50 is connected to an element to be controlled, such as a vent or heater, or the like. Thus, movement of the core element 12 is transmitted through the rod 50 to regulate the movement of a controlled element.

Figure 4:
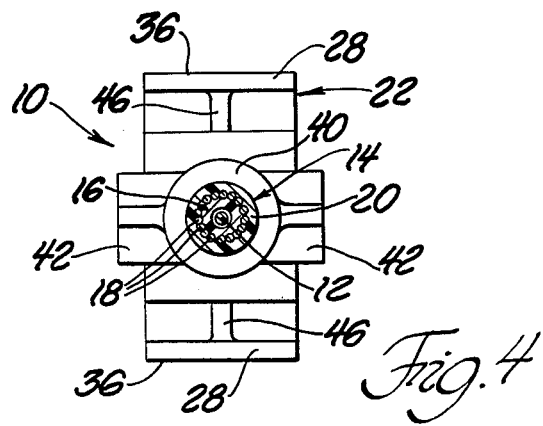
FIG. 4 is a view taken substantially along line 4—4 of FIG. 1.
Figure 5:
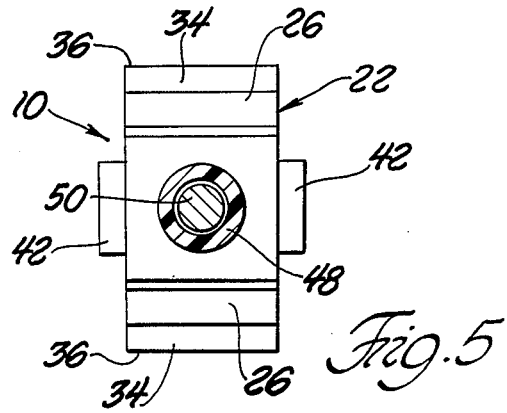
FIG. 5 is a view taken substantially along line 5—5 of FIG. 1.

The guide means 14 movably supports the motion-transmitting core element 12, such that the core element 12 can rotate or move longitudinally through the guide means 14. As best illustrated in FIG. 4, the guide means 14 is preferably of the type including an inner tubular member 16 surrounded be a plurality of wire-like filaments 18 helically wrapped around the inner tubular member 16 on a long lead. A casing 20 is disposed about the filaments 18 and the inner tubular member 16. In the preferred embodiment, the inner tubular member 16 and the casing 20 are made of an organic polymeric material, such as polyethylene, nylon, or the like.

The support means 22, which is attached to the guide means 14, is configured for moving through and retaining engagement with an aperture 24 in a bulkhead. This is accomplished by the support means 22 engaging opposite extremities of the aperture 24. In other words, the support means 22 is held in place within the aperture 24. The support means 22 includes a pair of legs 26 which are flexible radially inward as the fitting is inserted in the aperture 24.

Each of the legs 26 includes a distal end 28. Each leg 26 includes a wall-receiving groove 38 defined by a shoulder 30 and a spaced abutment 34. The shoulder 30 abuts the bulkhead such that it engages the far extremity of the aperture 24 when the support means 22 is in a retention position. The abutments 34 engage the near extremity of the aperture 24 in the retention position.

The support means 22 further includes tabs 36 extending from the abutments 34 for manually moving the legs 26 radially inwardly to a release position to release the abutments 34 and the shoulders 30 from engagement with the aperture 24. In other words, the radial dimension of the legs 26 and the shoulders 30 are reduced sufficiently to be withdrawn through the aperture 24. Force applied at the tabs 36 move the legs 26 toward the support means 22 to a point where the shoulder 30 of each leg 26 may be withdrawn through the aperture 24. The shoulder 30 and the abutment 34 define the groove 38 between them which engages the portion of the bulkhead immediate to the aperture 24. Thus, the groove 38 is disposed about the aperture 24 in the retention position.

The support means 22 is preferably formed of an organic polymeric material such as an acetal resin, polyethylene, polypropylene, nylon, or the like. Preferably, the support means 22 is molded about the guide means 14 so as to be mechanically locked thereto.

Figure 2:
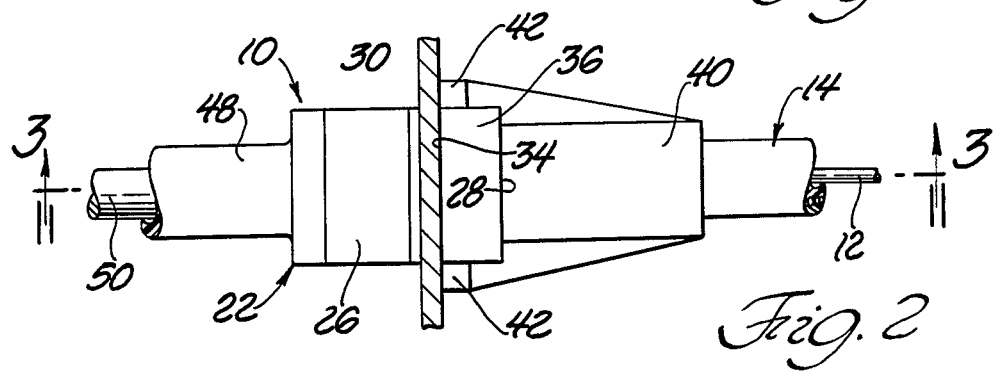
FIG. 2 is a view taken substantially along line 2—2 of FIG. 1.
Figure 3:
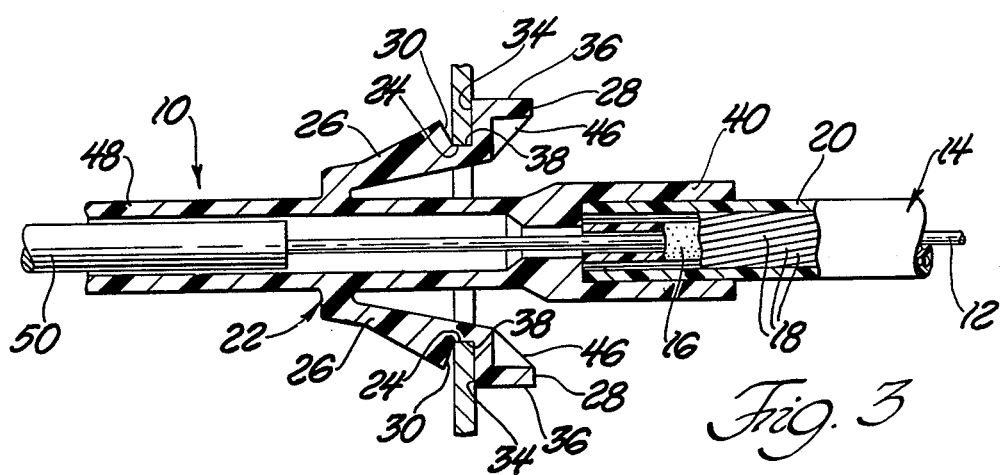
FIG. 3 is a cross-sectional fragmentary view taken substantially along line 3—3 of FIG. 2.

The support means 22 further includes in FIG. 2 the combination of the abutment 34 and one or more flanges 42 to define a stop means which engages the near extremity of the aperture 24 to prevent the support means 22 from being inserted too far into the aperture 24. In other words, the stop means prevents the support means 22 from completely moving through the aperture 24. At the same time, the shoulder 30 prevents the support means 22 from being removed from the aperture 24 while said support means 22 is in a retention position. In this fashion, both extremities of the aperture 24 are engaged by the support means 22.

The flanges 42 are disposed adjacent the body portion 40 where said body portion 40 meets the bulkhead. These flanges 42 extend radially outwardly from the body portion 40 on opposite sides thereof, transversely from the legs 26.

The assembly may take the form of the body portion 40 having a rectangular cross section, with the legs 26 extending from two opposed sides and the flanges 42 extending from the other two sides. In other words, the four sides of the rectangular cross section of the body portion 40 alternatively support a leg 26 and then a flange 42.

Each of the legs 26 has a greater thickness adjacent the shoulders 30 than adjacent the connection to the body portion 40. This increase in thickness as the leg 26 extends toward the distal end 28 accounts for an increased flexibility of the leg 26 which facilitates movement by the tabs 36.

The groove 38 has a bottom surface that forms a right angle with the surface of the adjacent abutment 34, and an obtuse angle with the shoulder 30 of said adjacent leg 26. Further, a rib 46 formed adjacent the tab 36 and the abutment 34 serves to reinforce the tab 36 and the abutment 34.

This invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A motion transmitting remote control assembly (10) of the type for transmitting motion in a curved path by a flexible motion-transmitting core element, said assembly (10) comprising; a motion-transmitting core element (12), guide means (14) for movably supporting said motion-transmitting core element (12), support means (22) for moving through and retaining engagement with an aperture (24) by engaging the near and far extremities of such an aperture (24), said support means (22) including a body portion (40) surrounding said core element (12) and a pair of legs (26) disposed on opposite sides of said body portion (40) and extending outwardly in a cantilevered fashion from said body portion (40) to distal ends (28), said legs (26) being flexible for moving radially inward as said support means (22) is inserted into the aperture (24), each of said distal ends (28) of said legs (26) having a wall-receiving groove (38) therein defined by a shoulder (30) spaced from an abutment (34) so that said shoulder (30) engages the far etremity of the aperture (24) as said abutment (34) engages the near extremity of the aperture (24) for retaining said support means (22) in the aperture (24), and a release tab (36) extending axially from each abutment (34) of each of said legs (26) for manually moving said legs (26) radially inwardly to release said abutments (34) and said shoulders (30) from engagement with the aperture (24) to remove said support means (22) from the aperture (24), said support means (22) including a stop means for engaging the near extremity of the aperture (24) to prevent said support means (22) from moving completely through the aperture (24), said stop means including a pair of flanges (42) extending radially outwardly from said body portion (40) on opposite sides thereof and in a direction transverse to the sides of said body portion (40) from which said legs (26) extend, each of said legs (26) having a greater thickness adjacent said shoulders (30) than adjacent the connection thereof to said body portion (40) so that each leg (26) increases in thickness from said body portion (40) to said distal end (28) thereof, said groove (38) having a bottom surface perpendicular to the surface of the adjacent abutment (34), said shoulder (30) of said adjacent leg (26) being disposed at an included angle of more than ninety degrees (90°) relative to said bottom surface of said groove (38), each abutment (34) and adjacent tab (36) defining an L shape as viewed in cross section and including a reinforcing rib (46) interconnecting each abutment (34) and adjacent tab (36) midway of the lengths thereof.

2. An assembly as set forth in claim 1 further characterized by said body portion (40) having a rectangular cross section with said legs (26) extending from two opposed sides thereof and said flanges (42) extending from the other two opposed sides thereof.

* * * * *